US010555641B2

(12) United States Patent
Jones et al.

(10) Patent No.: US 10,555,641 B2
(45) Date of Patent: Feb. 11, 2020

(54) COOKING GRILL WITH MULTIPLE GAS HEATING ZONES FRONT TO BACK FOR IMPROVED GRILL PLATE TEMPERATURE MANAGEMENT

(71) Applicant: GARLAND COMMERCIAL INDUSTRIES, LLC, Freeland, PA (US)

(72) Inventors: Douglas S. Jones, New Port Richey, FL (US); Michael Robin Sykes, Mono (CA); Christopher John Reis, Brampton (CA)

(73) Assignee: GARLAND COMMERCIAL INDUSTRIES LLC., New Port Richey, FL (US)

( * ) Notice: Subject to any disclaimer, the term of this patent is extended or adjusted under 35 U.S.C. 154(b) by 882 days.

(21) Appl. No.: 14/103,497

(22) Filed: Dec. 11, 2013

(65) Prior Publication Data

US 2014/0161953 A1   Jun. 12, 2014

Related U.S. Application Data

(60) Provisional application No. 61/735,808, filed on Dec. 11, 2012.

(51) Int. Cl.
*A47J 37/07* (2006.01)
*A47J 37/06* (2006.01)

(52) U.S. Cl.
CPC .................. *A47J 37/0611* (2013.01)

(58) Field of Classification Search
CPC .......................... A47J 37/0713; A47J 37/0754

USPC ............ 431/2; 432/122; 426/523; 126/39 B, 126/25 R; 99/349, 422, 450
See application file for complete search history.

(56) References Cited

U.S. PATENT DOCUMENTS

| 3,843,315 | A | * | 10/1974 | Sorensen | ............... A47J 37/044 432/122 |
| 4,433,001 | A | | 2/1984 | Weimer et al. | |
| 4,601,237 | A | * | 7/1986 | Harter | .................. A47J 37/0611 99/349 |

(Continued)

FOREIGN PATENT DOCUMENTS

WO     2014/008420 A2     1/2014

OTHER PUBLICATIONS

Office Action dated Feb. 15, 2016 for corresponding Chinese patent application No. 201310676611.3, pp. 14.

(Continued)

*Primary Examiner* — Steven B McAllister
*Assistant Examiner* — Desmond C Peyton
(74) *Attorney, Agent, or Firm* — Ohlandt, Greeley, Ruggiero & Perle, LLP

(57) ABSTRACT

The grill of the present disclosure provides multiple heating zones within a front-to-back direction of each cooking platen. Each cooking zone has a heating element associated therewith. The heating elements can be independently controlled, so that each of the heating zones can be operated at a different temperature if necessary. A controller can monitor and adjust the heat output of each element with a temperature probe that measures the temperature of the surface of the grill plate. One or more of the heating elements can be a gas burner. Electrical heating elements may also be used.

10 Claims, 14 Drawing Sheets

(56) References Cited

U.S. PATENT DOCUMENTS

| | | | | |
|---|---|---|---|---|
| 5,197,377 | A * | 3/1993 | Jennings | A47J 37/0611 99/331 |
| 5,676,043 | A * | 10/1997 | Best | A47J 37/0682 126/39 B |
| 5,934,182 | A * | 8/1999 | Harter | A47J 27/62 99/349 |
| 6,614,007 | B1 * | 9/2003 | Reay | A47J 37/0676 219/460.1 |
| 7,082,941 | B2 | 9/2006 | Jones et al. | |
| 7,575,000 | B2 | 8/2009 | Jones et al. | |
| 7,726,235 | B1 * | 6/2010 | Frantz | A47J 37/0676 126/39 BA |
| 7,793,649 | B2 | 9/2010 | Barkhouse et al. | |
| 2002/0117165 | A1 | 8/2002 | Turner | |
| 2003/0041744 | A1 * | 3/2003 | Stephen | A47J 37/0786 99/450 |
| 2004/0129693 | A1 * | 7/2004 | Hook | A47J 27/62 219/483 |
| 2005/0000095 | A1 | 1/2005 | Jones et al. | |
| 2005/0000957 | A1 | 1/2005 | Jones et al. | |
| 2005/0193897 | A1 * | 9/2005 | Nevarez | A47J 37/0611 99/349 |
| 2005/0279222 | A1 * | 12/2005 | Nevarez | A47J 37/0611 99/349 |
| 2006/0068067 | A1 * | 3/2006 | Zimmerman | A23L 1/01 426/281 |
| 2006/0254430 | A1 * | 11/2006 | Nevarez | A47J 27/62 99/349 |
| 2014/0014087 | A1 * | 1/2014 | Rosa | A47J 37/0704 126/25 R |
| 2014/0023755 | A1 * | 1/2014 | Claesson | A47J 37/049 426/231 |
| 2014/0161952 | A1 * | 6/2014 | Sykes | A47J 37/0611 426/523 |
| 2015/0238049 | A1 * | 8/2015 | Jones | A47J 37/0704 126/25 R |

OTHER PUBLICATIONS

International Search Report dated Apr. 18, 2014 from corresponding PCT/US2013/074436, pp. 3.
International Written Opinion dated Apr. 18, 2014 from corresponding PCT/US2013/074436, pp. 4.
Office Action dated Jun. 24, 2015 for corresponding Chinese patent application No. 201310676611.3, pp. 10.
Office Action dated May 4, 2017 for corresponding Chinese patent application No. 201310676611.3, pp. 15.
European Office Action dated Mar. 21, 2017 from corresponding to European Application No. 13863166.8, 4 pages.
Office Action dated Mar. 7, 2017 for corresponding Japanese patent application No. JP2015-545951, pp. 8.
Office Action dated Jun. 14, 2016 for corresponding Japanese patent application No. JP2015-545951, pp. 4.
Extended European Search Report and Opinion dated Jul. 11, 2016 from corresponding EP Application No. 13863166.8, 6 pages.
Office Action dated Nov. 1, 2016 for corresponding Chinese patent application No. 201310676611.3, pp. 15.
Canadian Patent Office action dated Sep. 8, 2016 from corresponding Canadian Patent Application No. 2,894,411, pp. 3.
Indian Office Action dated Mar. 22, 2019 for Indian application No. 4970/DELNP/2015.
Mexican Office Action dated Sep. 11, 2019 for corresponding Mexican patent application No. Mx/a/2015/007289.

* cited by examiner

COOKING GRILL WITH MULTIPLE GAS HEATING ZONES FRONT TO BACK FOR IMPROVED GRILL PLATE TEMPERATURE MANAGEMENT

CROSS-REFERENCE TO RELATED APPLICATION

The present application claims priority to U.S. Provisional Patent Application No. 61/735,808, filed on Dec. 11, 2012, which is herein incorporated by reference in its entirety.

BACKGROUND OF THE DISCLOSURE

1. Field of the Disclosure

This disclosure relates to a grill cooking surface having multiple independently controlled cooking zones.

2. Discussion of the Related Art

Conventional griddle plates or platens are made from steel or cast iron and are heated by tubular sheathed electrical heating elements as, for example, disclosed in U.S. Pat. No. 3,843,315. The heating elements are maintained in contact with the underside of the griddle plate by a clamping system to maximize heat transfer and prevent overheating of the heating elements. The clamping system involves a substantial and often complex metal fabrication that adds cost and weight to the cooking appliance. The clamping system is secured to the griddle plate by a large number of studs that are screwed into holes or welded on to the griddle plate. This also adds cost and weight to the cooking appliance.

A non-contact grill is described in U.S. Pat. No. 6,614,007 as having one or more separate heater boxes secured to the underside of the griddle plate. Separate infrared heating elements are disposed in the heating boxes so as to be separated by a gap from the underside of the griddle plate. This arrangement provides a substantially uniform heating to the underside of the griddle plate.

U.S. Pat. Nos. 7,082,941 and 7,575,000, both of which are incorporated herein in their entirety by reference thereto, disclose a conventional clamshell grill having a platen with a plurality of heating zones, spaced side to side. "Side to side" in this context means from the operator's left to right or vice versa, when they are standing in front of the apparatus facing the cooking surface. Each heating zone has a heating unit. Thermal transfer between adjacent heat zones is limited by air gaps and insulation. The heater unit of each zone has a heater that is disposed to attain substantially uniform temperature of the platen for that zone before a temperature sensor senses a set temperature during either pre-heat or recovery modes.

As such, conventional gas heated grill platen heating systems, as discussed above, have sectioned heating across the grill platen in side-to-side zones that are controlled by a single temperature control point for each heating zone front to back. ("Front to back", as discussed in greater detail below, refers to the side of the cooking surface closest and furthest away from the operator, respectively, when they are standing in front of the apparatus facing the cooking surface.) Depending on the location and quantity of food product being cooked in each zone, sections of the grill plate can become over or under heated causing inconsistent product cooking times or doneness. In addition, in the grills described above, with one heater per zone, unnecessary and excess energy is consumed when each platen is only partially loaded with food product, and the entire zone is heated when only a portion of the grill surface is being used.

The present disclosure solves this problem by splitting up the front to back of each cooking platen into multiple independently controlled zones front to back, thus increasing grill plate temperature evenness during idle, partial and full load cooking operations. This becomes even more important when the grill has an upper clamshell cooking surface that does not cover the entire lower grill plate surface front to back. Conventional gas burner systems do not allow for the splitting up from front to back of each cooking platen into multiple independently controlled zones.

The present disclosure also provides many additional advantages, which shall become apparent as described below.

SUMMARY OF THE DISCLOSURE

The present disclosure pertains to a cooking grill with multiple gas heating and independently controlled cooking zones front to back, for improved grill plate temperature management. The present disclosure also provides for having two or more, preferably three, heating zones front to back for each right to left heating platen, depending on the grill design.

When using gas burners, the grill of the present disclosure further comprises a separate burner in each of the plurality of temperature zones. The burner comprises a sealed opening in the middle to allow for a temperature measurement probe to be mounted through the middle of the burner and substantially near a bottom surface of a grill plate disposed above the heater box, whereby the controller monitors a temperature near the surface of the plate by means of the temperature measurement probe.

Thus, in one embodiment, the present disclosure provides a grill for cooking food products. The grill comprises a substantially flat grill plate comprising a top surface and a bottom surface, the top surface for receiving the food products, a plurality of heating elements below the bottom surface, and a chassis for supporting the grill plate and the plurality of heating elements. The grill further comprises a controller in communication with each of the plurality of heating elements, wherein the grill plate is divided into a plurality of separate heating zones. Each of the heating zones has a heating element associated therewith, and the controller controls an operating temperature of each of the plurality of heating elements independently.

In another embodiment, the present disclosure provides a method of operating a grill, the grill comprising a flat grill plate divided into a plurality of separate heating zones and a plurality of heating elements, each heating zone having a heating element associated therewith, and wherein heating elements provide heat to the associated heating zone. The method comprises the steps of controlling each of the heating elements independently, monitoring a temperature in each of the heating zones, and adjusting an amount of heat supplied to each of the heating zones by the heating element based at least in part on the monitoring step.

DETAILED DESCRIPTION OF THE DISCLOSURE

Figure 1:
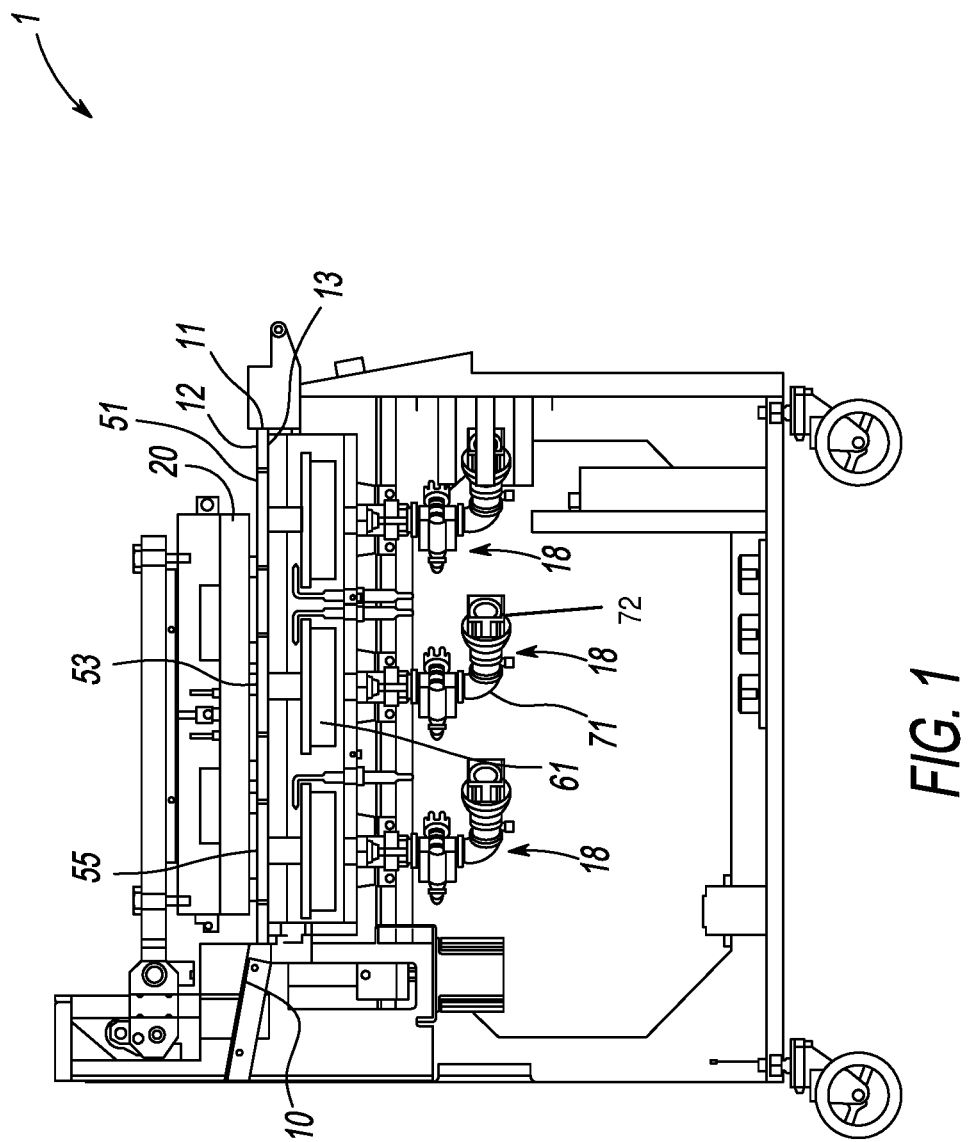
FIG. 1 is a side, planar view of a clamshell grill of the present disclosure, having three independently controlled gas heating zones front to back.

Referring to FIGS. 1-11, clamshell grill 1 according to the present disclosure is shown. Grill 1 comprises a support structure 10 to which a lower cooking platen 11 is horizontally mounted. Grill plate or lower platen 11 has a smooth level cooking surface on its top or upper surface 12, where food products can be placed. Lower platen 11 is heated to cooking temperature by a plurality of heating units 18, which may be gas or electric. By way of example, three gas heating units 18 are shown. Lower platen 11 can be of substantial dimension, for example two feet by three feet, to accommodate large numbers of food items at once. In some embodiments, grill 1 may have an upper platen 20, discussed in greater detail below.

Grill 1 has a heating unit 18 for each of a plurality of front to back cooking zones (e.g., 51, 53, and 55, discussed below) on each platen 11 in use. As previously discussed, this arrangement allows flexibility in cooking that is not available in current grills. Each of heating units 18 can be controlled independently of one another, providing a desired amount of heat to each of the heating zones. This allows a user to place food products needing different cook times and/or temperatures on the same platen 11. It also allows for one or more of the zones on each platen 11 to be unused, and thus unheated. Either case allows for greater efficiency and flexibility over current grills, which use one heating element to heat an entire platen.

As used in the present disclosure, "side to side" or "left to right" refers to a direction from the perspective of an operator standing in front of grill 1 and facing platen 11. From this same perspective, a "front to back" direction is from the part of platen 11 closest to and furthest from the user, respectively. The present disclosure contemplates rectangular-shaped platens 11, which have a length that is greater than a width. In the case of such rectangular-shaped platens 11 oriented in the manner shown in the Figures, with a long and short side, a "side to side" direction or axis would be from one platen 11 to an adjacent platen 11, along the width or short side. A "front to back" direction or axis would be from one end of a single platen 11 to another, along its length or long side. The present disclosure also contemplates the use of square-shaped platens 11, in which case a "front-to-back" orientation would be toward and away from an operator, respectively.

Figure 2:
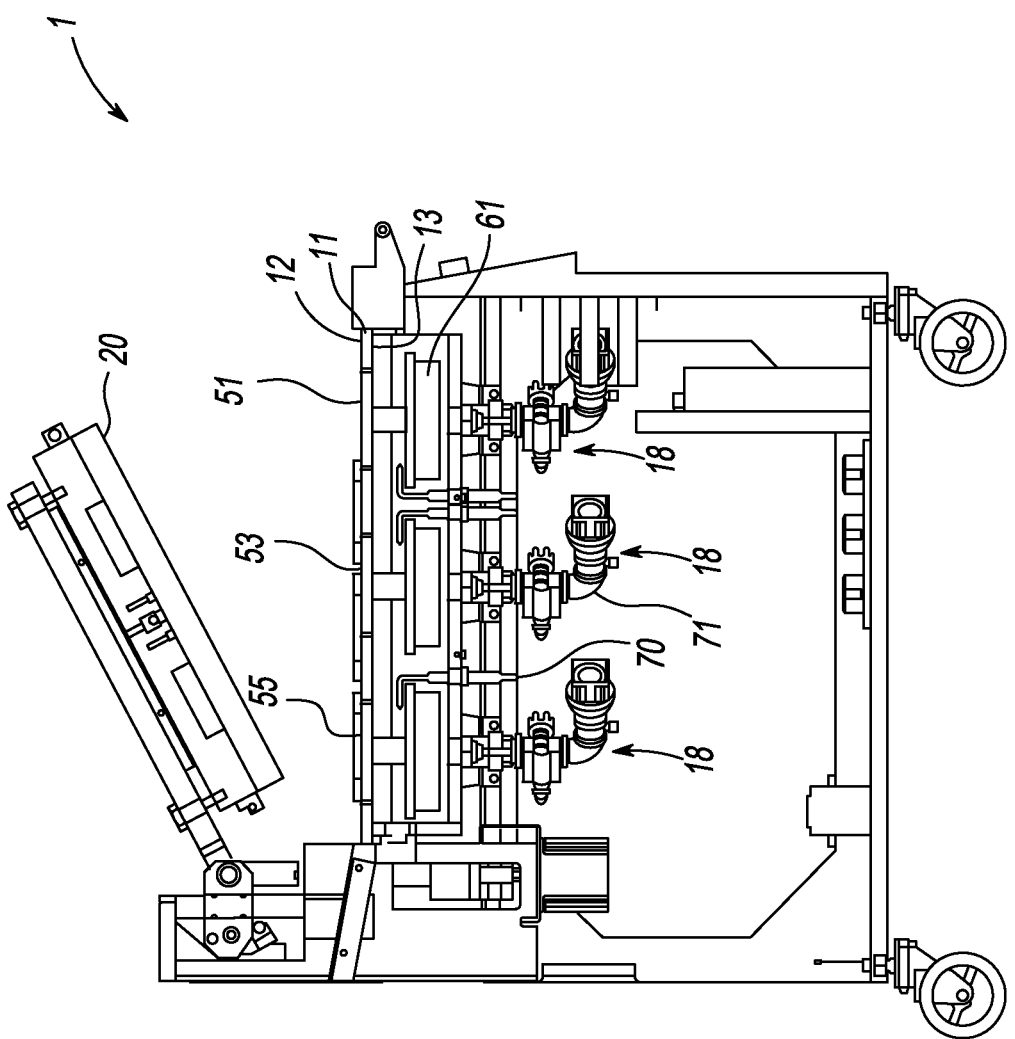
FIG. 2 is a side, planar view of the clamshell grill of FIG. 1, showing the upper platen in a raised position.

As shown in FIGS. 1 and 2, grill 1 has three independently controlled heating zones 51, 53, and 55, from the front to back of platen 11. Each of heating zones 51, 53, and 55 has a heating unit 18 associated therewith. Each of heating units 18 is located in proximity to bottom surface 13 of platen 11, and is in thermal communication therewith, to heat food products placed on top surface 12. As shown in FIG. 1, each of heating units 18 can be a gas-based heating unit, and thus have a burner plenum 61 and feed pipe 71 associated therewith.

In the shown embodiment, there are three heating zones 51, 53, and 55, each with a heating unit 18 associated therewith. An air-gas mixture is introduced to heating unit 18 through its feed pipe 71 and combusted in the plenum 61, providing heat to platen 11. Although there are three heating zones shown in the Figures, the present disclosure contemplates other numbers of heating zones, such as two or more (i.e., a plurality). Burner box 63 (see FIG. 4) encloses plenums 61, and is sealed up to the bottom of the platen 11, forming a heating zone between bottom surface 13 and plenums 61. Spent combustion gases can exit the heating zone through one or more flues within box 63, for example flue 64 at the rear of box 63.

Heating units 18 can be electric or gas-powered, or a mixture the two. In the shown embodiment, each of heating elements or units 18 is a gas-powered heating element. In a preferred embodiment, at least two of heating units 18 are gas-powered, and more preferably, all of heating units 18 are gas-powered. One or more of heating units 18 can be electric. For example, grill 1 can have an electric heating unit 18 under front zone 51, and gas heating units 18 under middle heating zone 53 and back heating zone 55.

Figure 3:
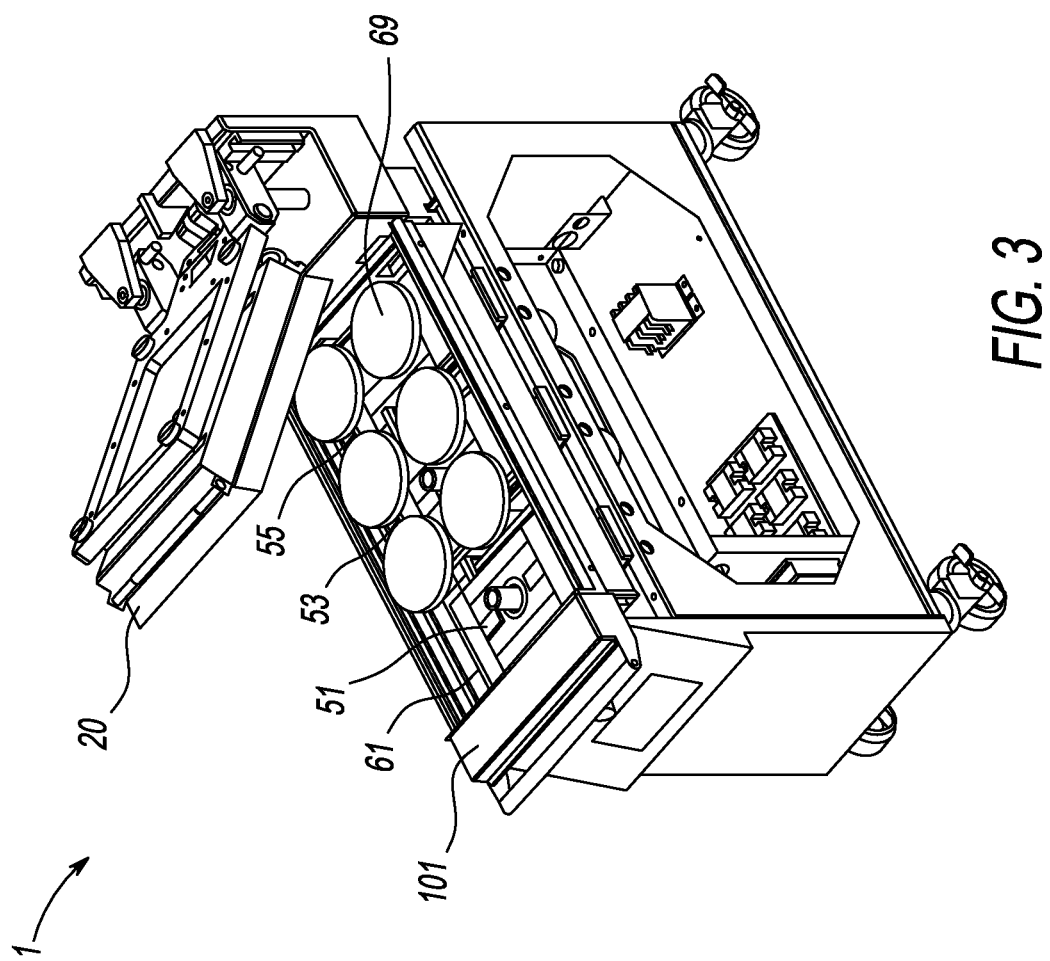
FIG. 3 is a top, perspective view of a single lane of the clamshell grill of FIG. 1, with a grill plate or platen removed.
Figure 4:
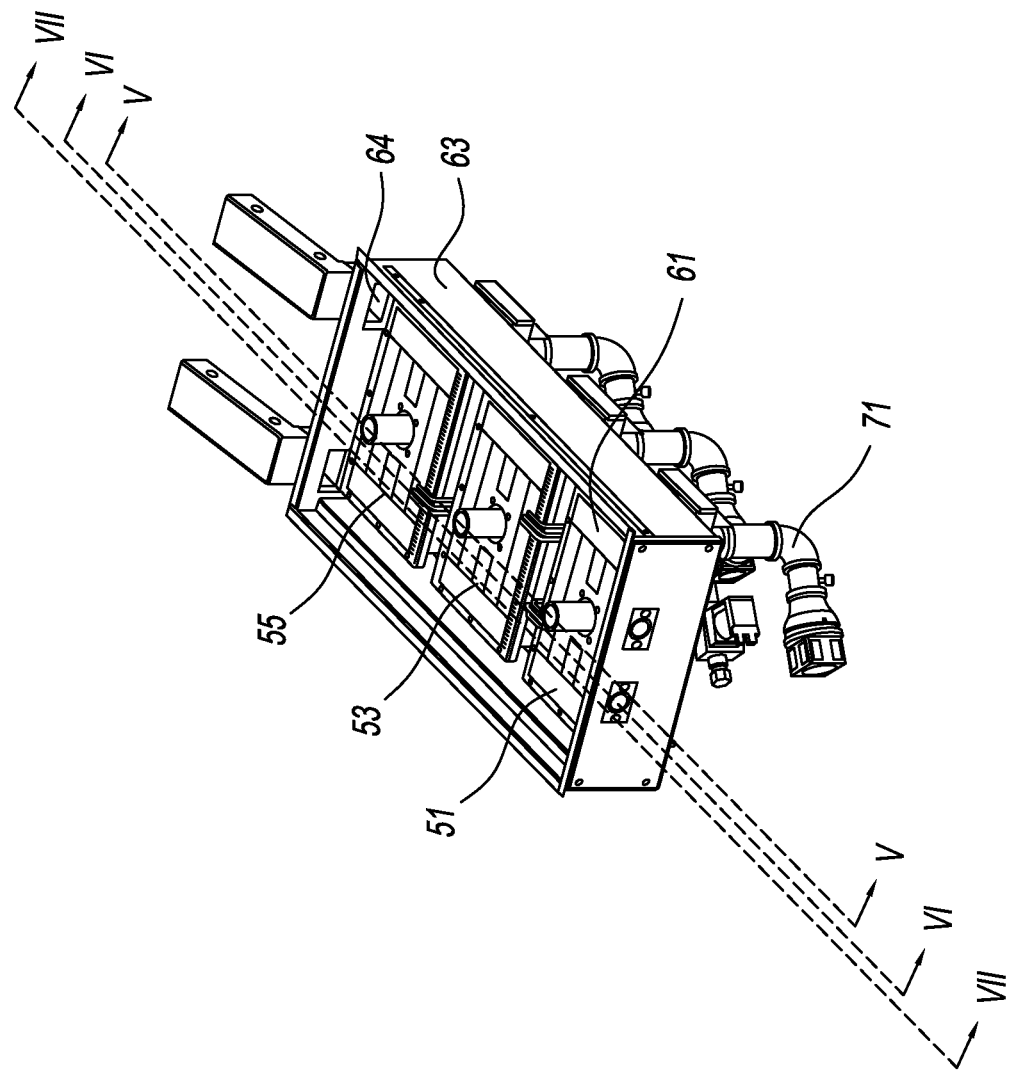
FIG. 4 is a top, front, right-side view of the single lane of FIG. 3, with the support structure and upper platen removed.
Figure 5:
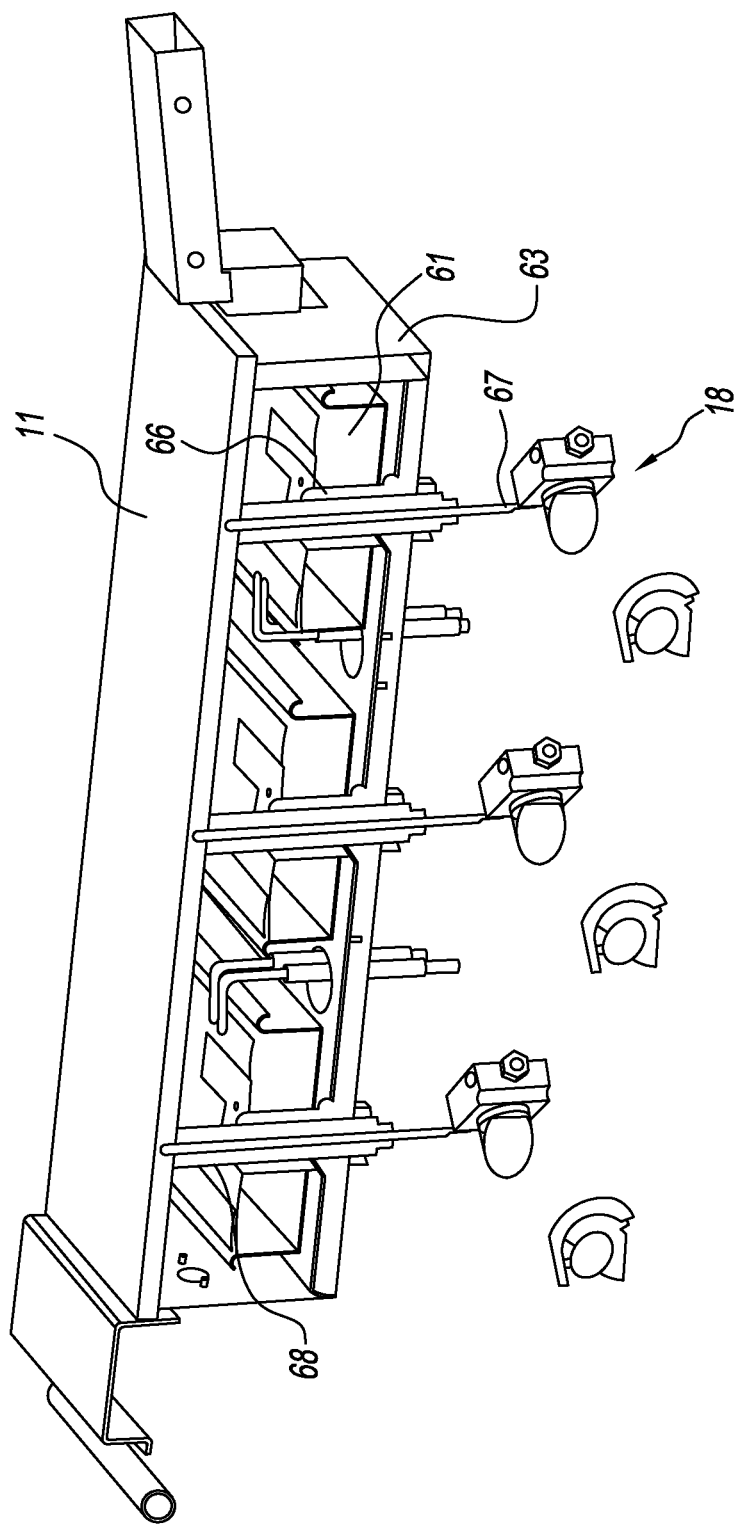
FIG. 5 is a cross-sectional view of the single lane of FIG. 4, along line V-V.

Referring to FIGS. 3 and 4, a single lane 101 of grill 1 is shown, having the three zones 51, 53, and 55, and with platen 11 removed. The term "single lane" is used to denote one platen 11 having a plurality of heating zones. FIG. 3 also shows food product 69 placed on what would be platen 11. In this view, platen 11 has been removed to show plenums 61, beneath heating zones 51, 53, and 55. FIG. 4 shows the single lane without upper platen 20 or food product 69, so that each of plenums 61 can be seen more clearly.

Figure 12:
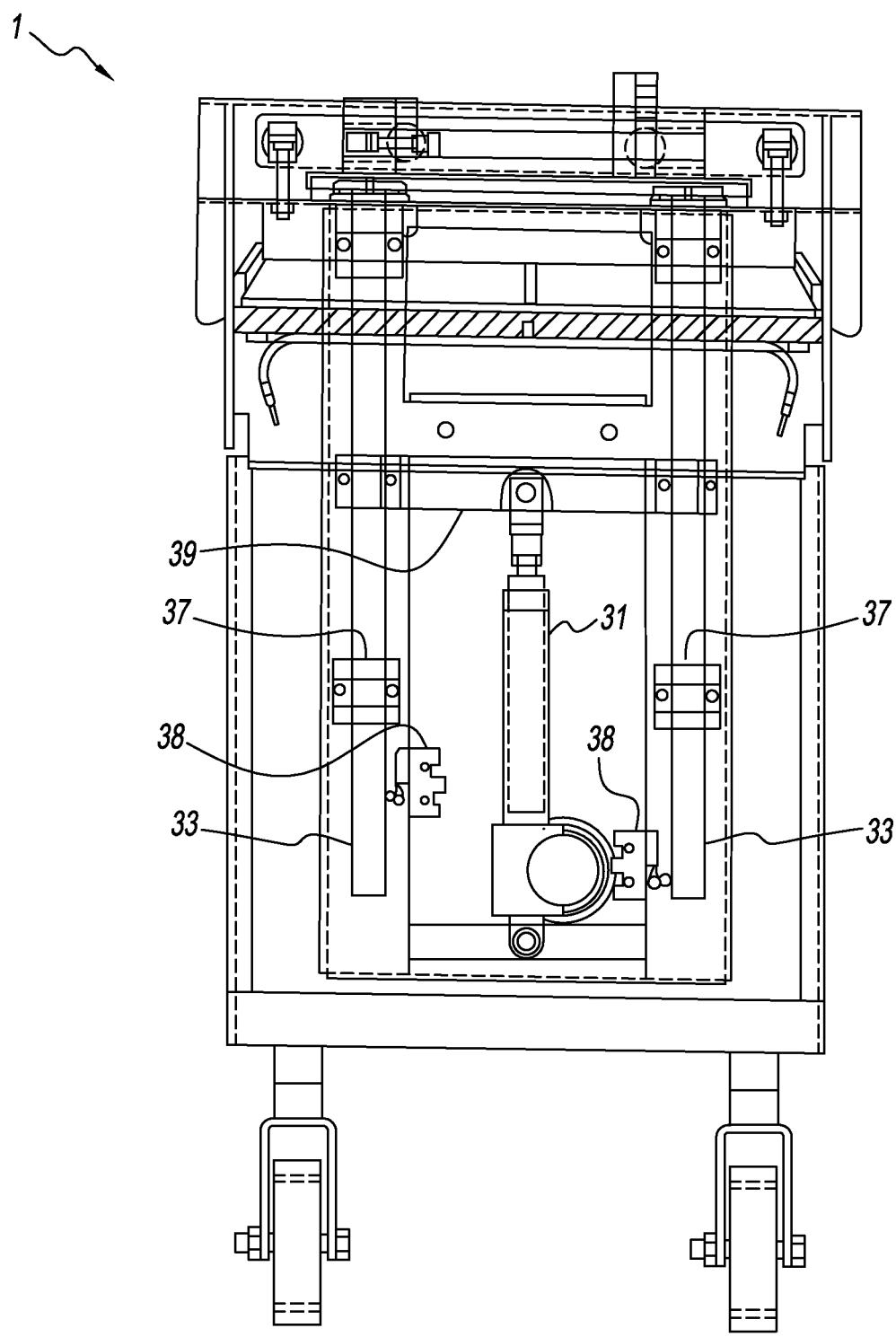
FIG. 12 is a rear view of the clamshell grill of FIG. 11.
Figure 13:
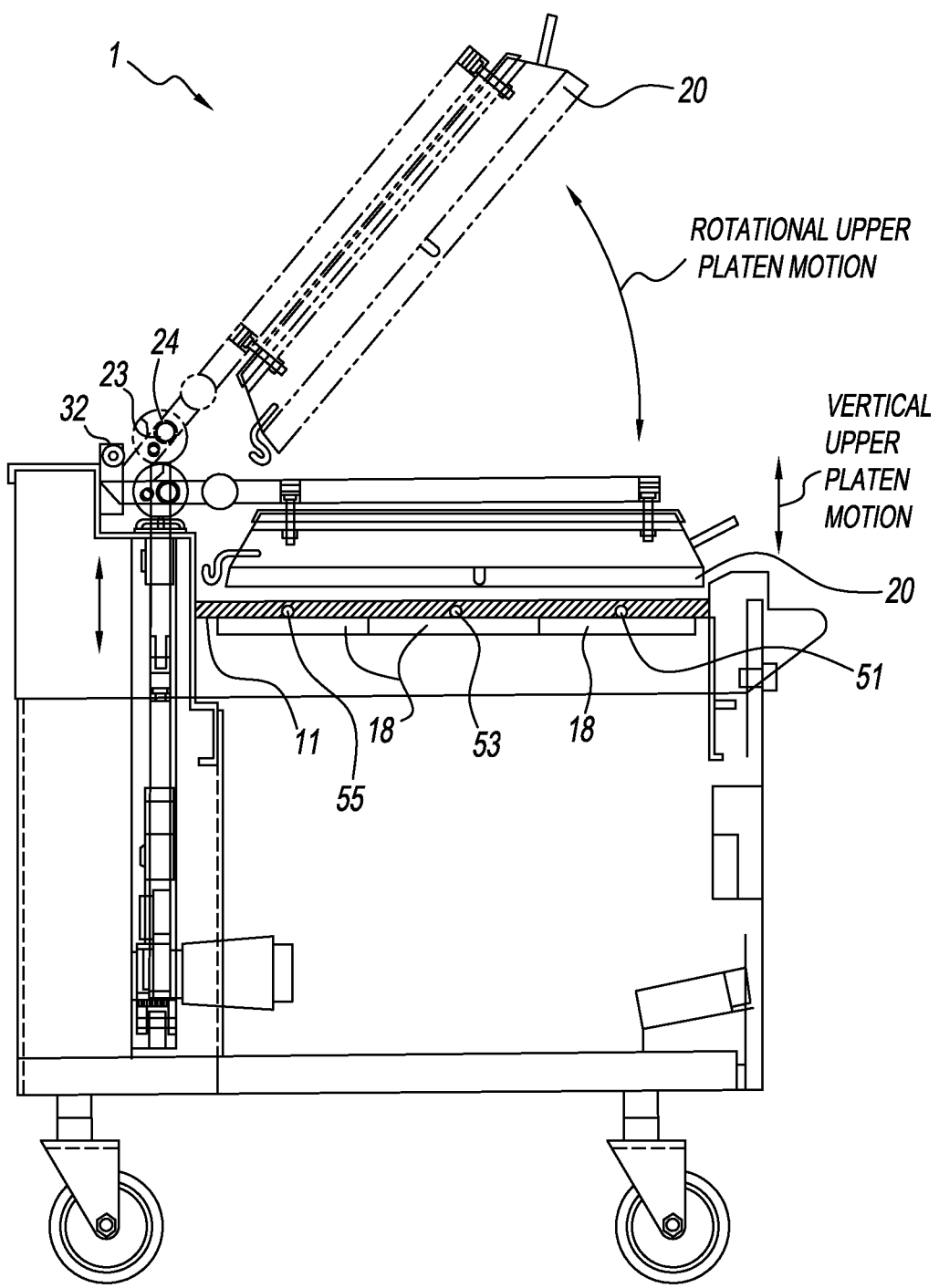
FIG. 13 is a second side view of the clamshell grill of FIG. 12, with the upper platen in a raised position.

Each heating unit 18 can also have a point or opening through which a temperature sensing probe 67 can extend (See, e.g., FIG. 3, in plenum 61). Temperature sensing probe 67 can be mounted in heating unit 18, projecting out into the plenum, to a point near the bottom surface of platen 11. Probe 67 can give a control system 43 (shown in FIGS. 11-13) information about the temperature of the surface over each of the burners, thereby allowing control system 43 to activate each independent heating unit 18 separately. Control system 43 continuously receives temperature information from probes 67, during all conditions (i.e., both idle and during cooking) when grill 1 is on.

When using multiple gas burners as heating units 18, in order to independently operate them within a box that has limited venting, an additional feature to the system may be helpful. The control system 43 can to manage the combustion air blower fans 72 for each burner heating unit 18, to keep heat from burner box 63 from backing up through the burner heating units 18 that are not heating. To achieve this goal, control system 43 will have to control burner heating units 18 that are not heating, to run the combustion air fan(s) at a low air flow to prevent damage to their components. There can be two ways to eliminate backflow of heat from burner box 63 when at least one burner heating unit 18 is heating and adjacent ones are not heating. This can be achieved either with some type of valve that closes when a burner heating unit 18 is not on (or a similar device that achieves the same effect), or running the burner fans at a low speed to prevent backflow.

As previously discussed, one advantage of grill 1 is that it can operate very efficiently during "partial load" cooking—i.e., when there isn't food on one or more of the heating zones on platen 11. For example, in the shown embodiment, a "partial load" cooking operation would be when food product is placed on heating zone 51, but not zones 53 or 57. In this situation, the control system 43 will only operate heating units 18 under zones with food product thereon. This prevents the overheating of the inactive heating units 18, and the loss of energy to keep an idle heating zone hot.

A further advantage of grill 1 is that control system 43 can detect both when a food product is placed anywhere on platen 11, and removed from the same, far quicker than would grills with a single central zone monitoring point. Since there are multiple front-to-back zones on platen 11, there are multiple temperature probes 67. Thus, if a food product is placed at one end of platen 11, grill 1 reacts quickly, since there is a probe 67 nearby. In currently available grills, there may only be one temperature probe at a center of the platen, and it would take much longer for that probe to detect the food product.

The multiple zone arrangement of grill 1 also accommodates for temperature inconsistencies that may arise from the platen's placement. For example, front zone 51 may lose heat to the front rail of grill 1, and rear zone 55 may lose heat to the backsplash of grill 1.

With multiple probes 67, the control system of grill 1 has a better ability to regulate the temperature across all of the zones, and accommodate for any heat loss at the front or rear of platen 11. A grill with one centrally located temperature probe would not have this ability.

Figure 6:
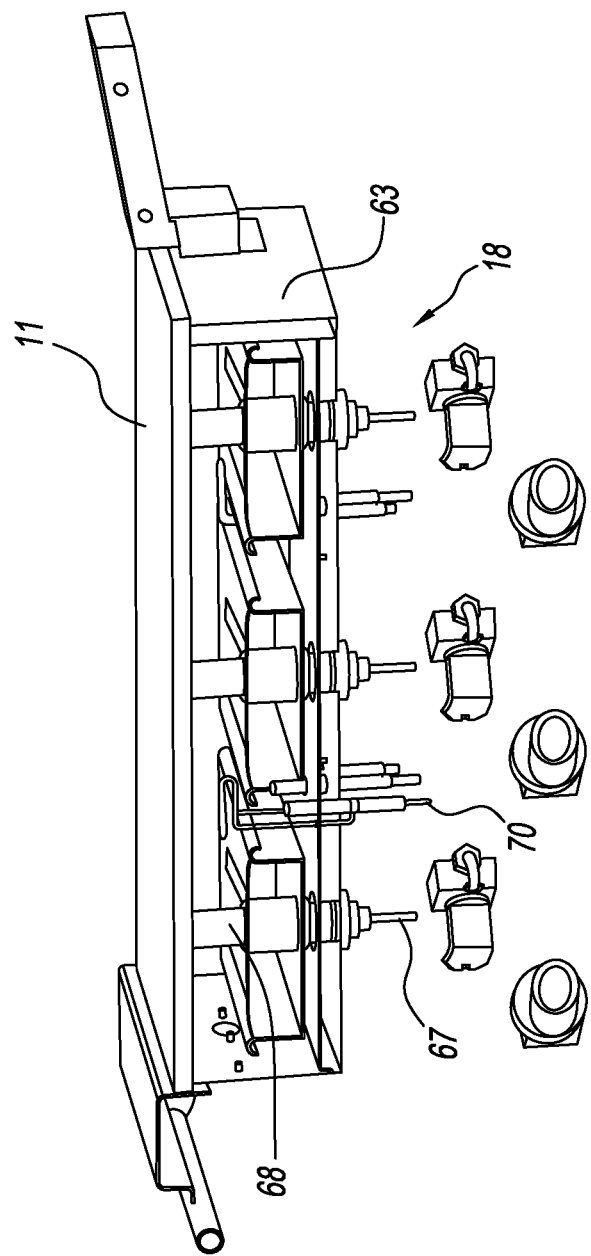
FIG. 6 is a cross-sectional view of the single lane of FIG. 4, along line VI-VI.
Figure 7:
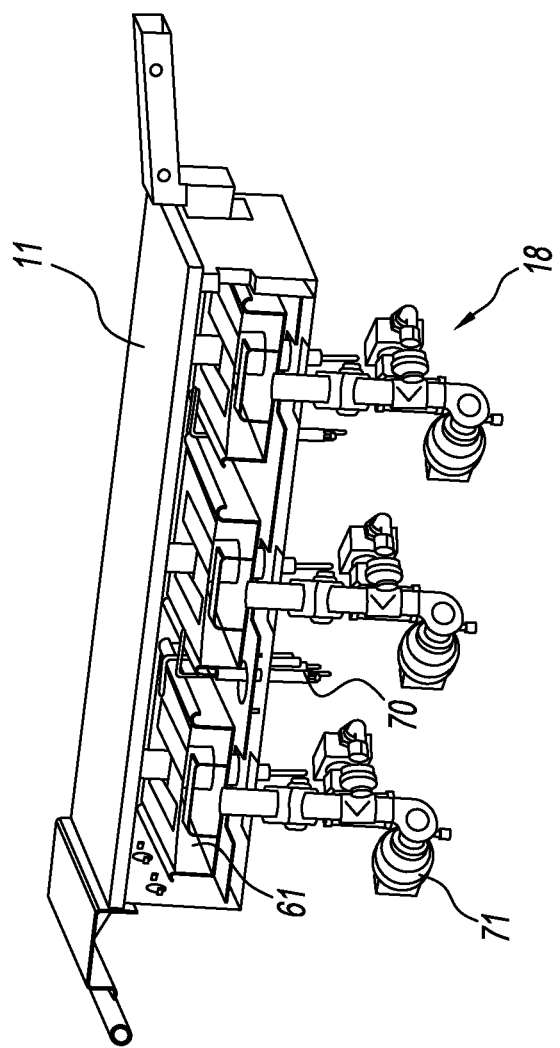
FIG. 7 is a cross-sectional view of the single lane of FIG. 4, along line VII-VII.
Figure 8:
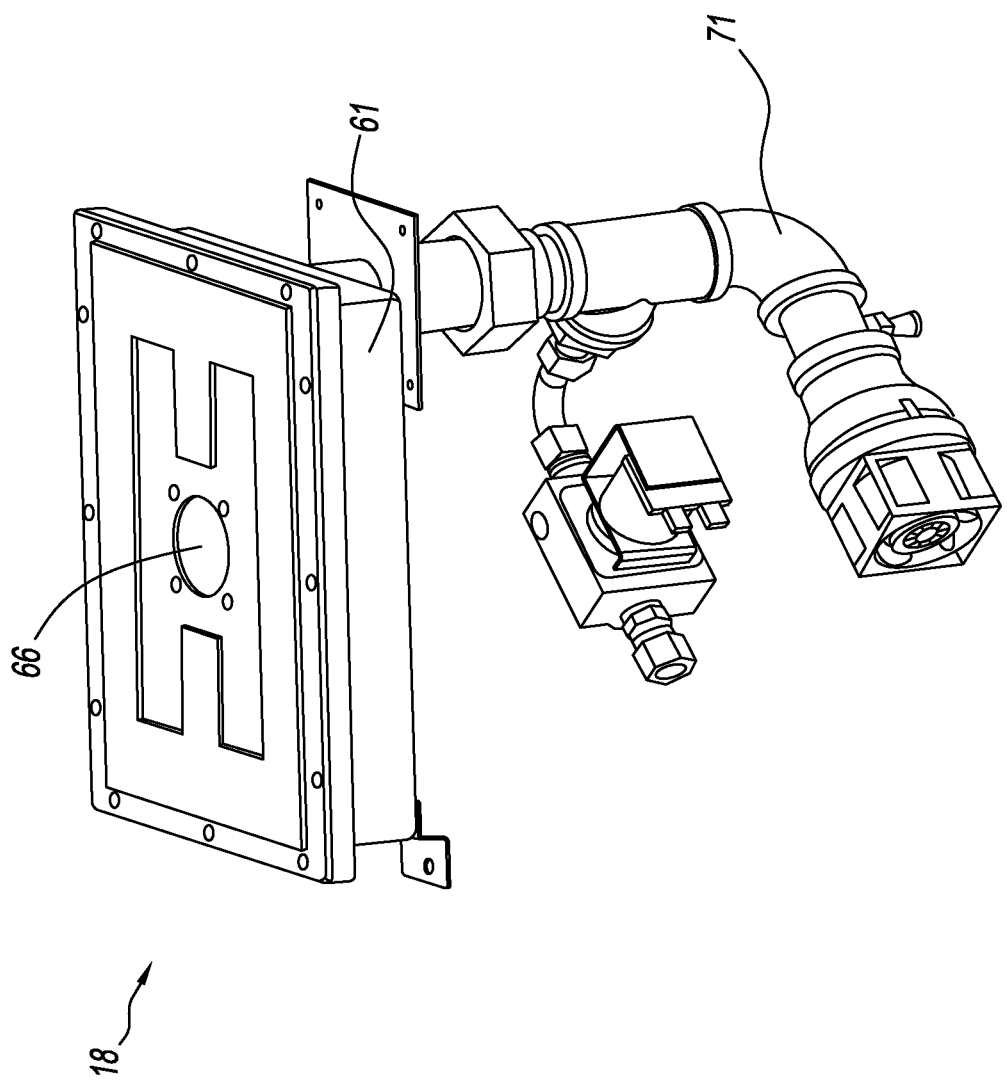
FIG. 8 is a perspective view of a gas heating element of the present disclosure.

FIGS. 5-8 show cross-sectional and isolated views of heating elements 18, when heating elements 18 are gas-powered burners. As shown and previously discussed, heating elements 18 have a sealed hole 66 through with probes 67 project, so they can monitor the temperature near the surface of plate 11. Referring specifically to FIG. 6, a heat shield 68 can protect temperature probe 67. Heat shield 68 is a tube larger than temperature probe 67, is attached to the underside of platen 11, and extends outside of burner box 63. This arrangement keeps heated air in box 63 from escaping. Referring specifically to FIG. 7, ignition devices 70 ignite the air-gas mixture being fed from feed pipe 71, so that the mixture burns at or above the surface of plenum 61.

Typically, burners are not constructed to be forced draft burner systems in a positively pressurized combustion chamber with multiple fan controls. One of the additional features that makes grill 1 of the present disclosure unique is that control system 43 will run the blowers of the burner system within the same combustion chamber at a speed (may not be full speed) sufficient to keep the hot gases in the combustion chamber from escaping through burners that are not heating at the time when one of its neighboring burners are on.

Figure 9:
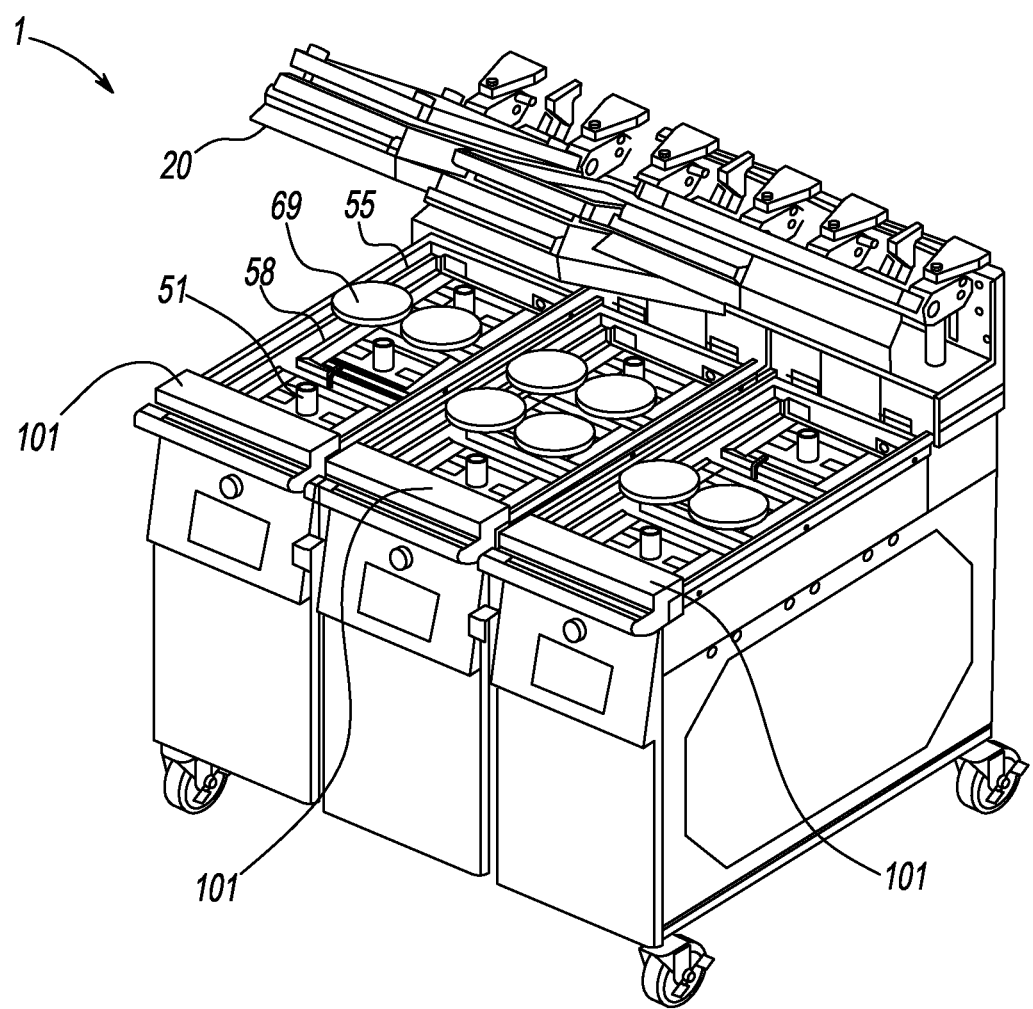
FIG. 9 is a front, right-side perspective view of the grill of the present disclosure, multiple lanes in a side-to-side arrangement.
Figure 10:
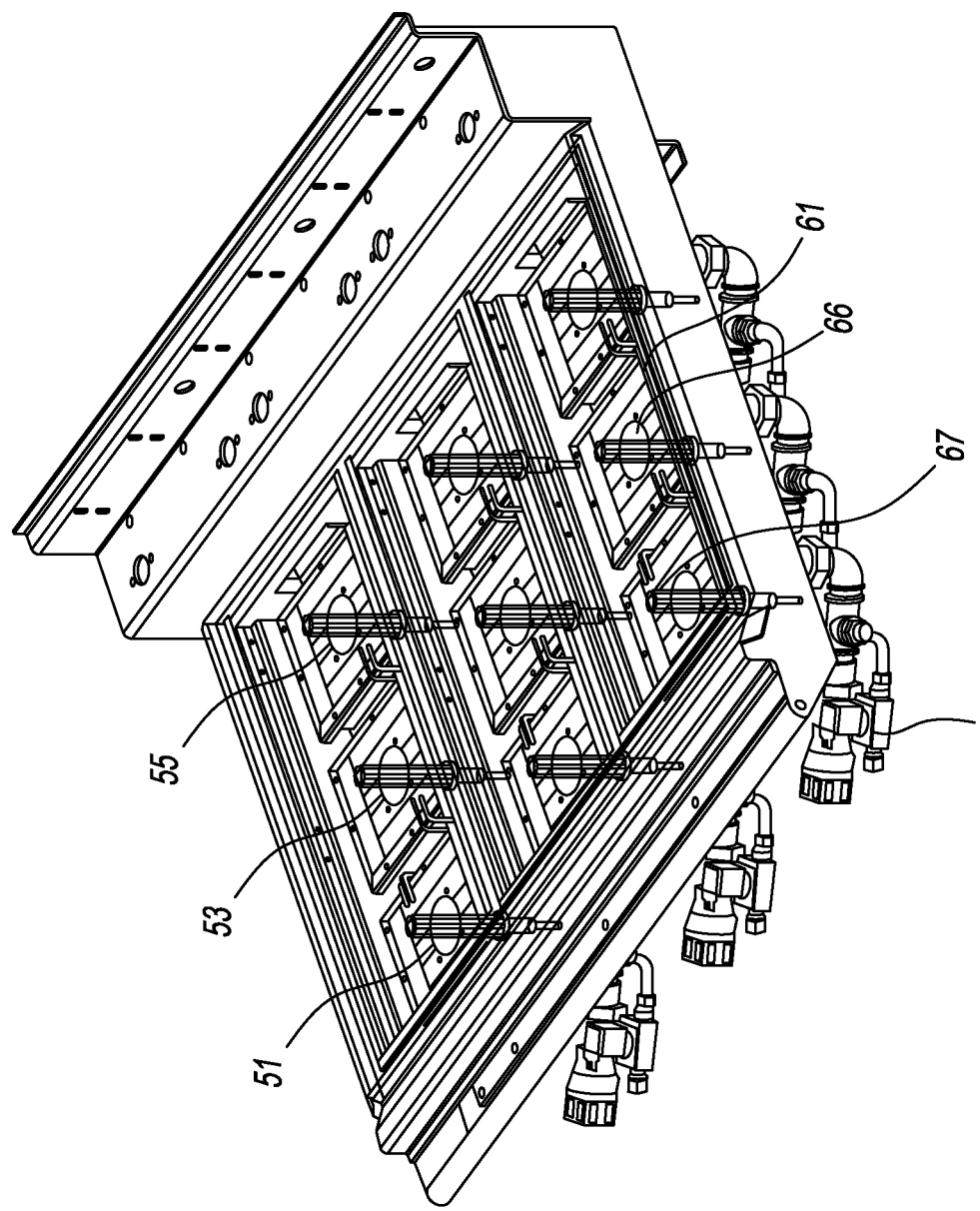
FIG. 10 is a front, right-side perspective view of the three left to right isolated grill plates of FIG. 9, wherein the grill plates, support structure, and upper platen have been removed.
Figure 11:
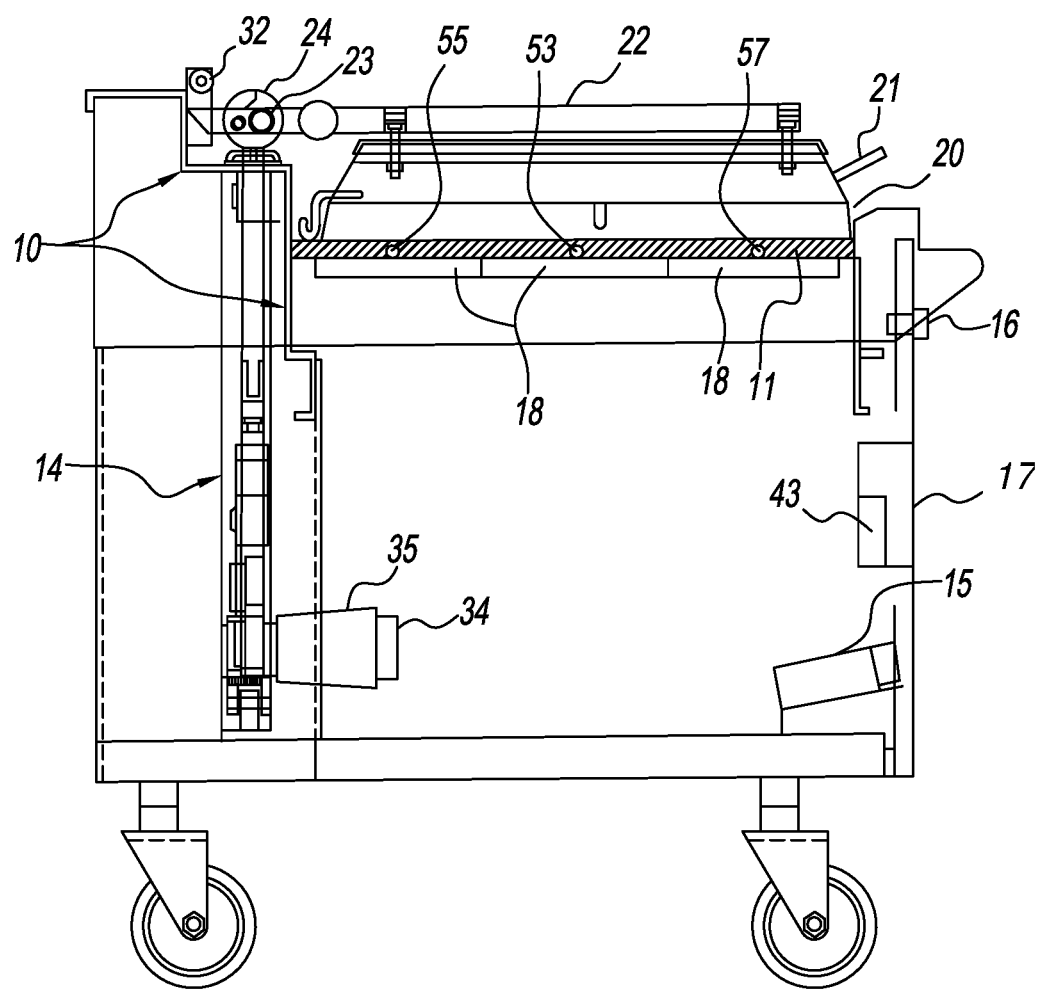
FIG. 11 is a side view of an additional embodiment of the clamshell grill of the present disclosure.

Grill 1 can have a single lane, as shown and previously discussed. As shown in FIGS. 9 and 10, however, grill 1 can have a plurality of lanes 101 connected to one another side-by-side. In the shown embodiment, there are three lanes 101. Each lane 101 can have its own platen 11 and a plurality of heating zones and associated heating units 18, as described above. Each lane 101 can be isolated from other lanes 101, thermally and electrically, so that each lane 101 has its own control system 43. Alternatively, a single control system can operate all of lanes 101 simultaneously, though each of lanes 101 would retain its independent temperature control.

Grill 1 may or may not have upper cooking surface or upper platen 20. Referring specifically to FIGS. 11-14C, in such an embodiment, an upper platen assembly is movably mounted to the rear of support structure 10 by means of a positioning mechanism. When employed, the upper platen assembly comprises an upper cooking platen 20 heated to cooking temperature by heating elements mounted within a casing. Upper cooking platen 20 is either smaller than or equivalently sized to lower cooking platen 11. (It is not mandatory, but upper platen 20 can have a handle 21 mounted on its front side for manual manipulation of the upper platen assembly.) In a preferred embodiment, a single upper platen is movably mounted over a single cooking zone employing multiple gas independently controlled heating zones. Lower platen 11 may be the width of one upper platen 20, or multiple upper platens 20 over a wider lower platen 11 with multiple front to back zones coupled to the associated upper platen 20.

Figure 14C:
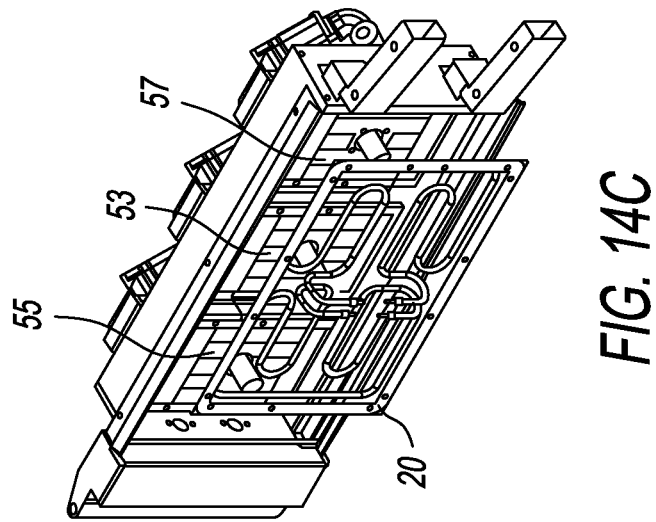
FIG. 14C is a perspective schematic drawing of the heating elements of FIG. 14A.
Figure 14A:
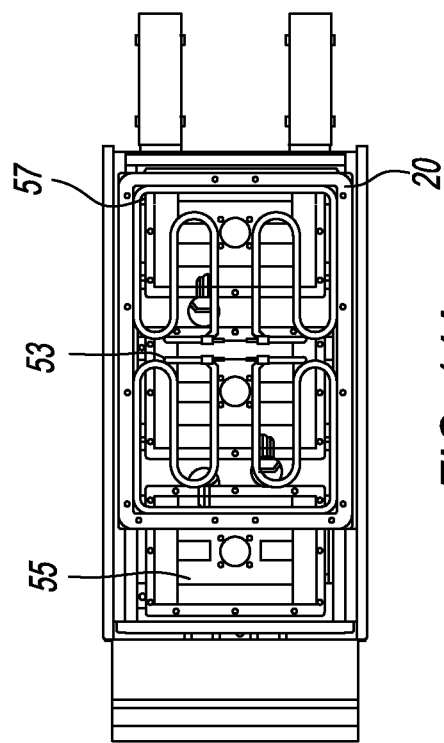
FIG. 14A is a top schematic drawing of the heating elements of upper and lower platens in the grill of the present disclosure.
Figure 14B:
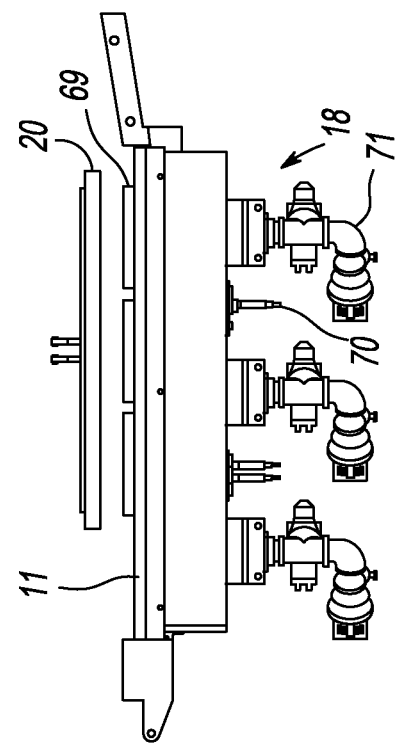
FIG. 14B is a side schematic drawing of the heating elements of FIG. 14A.

In addition, with multiple heating elements 18 and heating zones (e.g., 51, 53, and 55), grill 1 can be designed so that the zones in platen 11 match the size and location of upper cooking surface heating zones in platen 20. For example, if upper platen 20 has two independent temperature zones, lower platen 11 can have two zones and two heating elements 18 that line up when upper platen 20 is parallel to platen 11. If a food product load is only placed in one of the zones, then only one zone in each of platen 11 and upper platen 20 will have to respond. FIGS. 14A-14C show schematics of how heating elements in upper platen 20 would align with those (51, 53, 55) in lower platen 11.

The positioning mechanism facilitates two distinct motions by upper platen 20 from its uppermost position to a cooking position. In this embodiment, a linear actuator 31 is linked to two vertical reciprocating shafts 33 by an actuator cross bar linkage 39. Actuator cross bar linkage 39 is clamped to vertical reciprocating shafts 33, which run through linear motion bearings 37. Vertical shafts 33 are affixed to arm pivot/stop heads 24. Cantilever bars 22 run through arm pivot/stop heads 24 through rotational pivot bearings 23. When upper platen 20 is in its uppermost rotational position (see FIG. 13), linear actuator 31 is extended to its maximum position, vertical reciprocating shafts 33 and arm pivot/stop heads 24 are extended upward and to a position which forces the back end of cantilever bars 22 to contact rotational bearing 32 forcing rotational motion of upper platen 20 to an angle of approximately 54° from the horizontal. When linear actuator motion is reversed, upper platen 20 descends both vertically and through an arc caused by the cantilever weight of upper platen 20 maintaining contact between rotational bearing 32 and back of cantilever bars 22. When cantilever bars 22 and upper platen 20 become parallel with lower platen 11, the stop portion of arm pivot/stop head 24 stops the rotational motion of cantilever bars 22 causing purely vertical motion of upper platen 20 from this point and further down to any of the cooking positions.

The linear actuator assembly comprises a drive motor 35, a linear actuator 31, two substantially vertical reciprocating shafts 33 and position sensor switches 38. Linear actuator 31, when activated, moves upper platen 20 vertically while the cantilever weight of upper platen 20 maintains contact between arm pivot/stop head 24 until the back of cantilever bar 22 makes contact with rotational bearing 32. This movement ensures that upper platen 20 is constantly parallel to lower platen 11 during this stage of upper platen travel. Once cantilever bar 22 makes contact with rotational bearing 32 the vertical motion is changed to rotational motion to a point where upper platen 20 is raised to the point at which an upper position sensor switch 39 is set (approximately 54° above horizontal). An audible signal is sounded five seconds prior to the start of upward platen movement to alert the operator of impending upper platen movement. When activation button or buttons 16 are depressed simultaneously to start a cooking cycle, a user interface controller 17 sends information to a motor position controller 15. This information is used by motor position controller 15 to activate linear drive motor 35. The action of the rotational motion of linear drive motor 35 causes electrical pulses to be generated by a positioning pulse encoder 34. The pulses generated by positioning pulse generator 34 are received by motor position controller 15. This information and the activation of lower position sensor switch 38 allows motor controller 15 to accurately position the entire drive system to a predetermined upper platen position for cooking.

To illustrate, a typical cooking cycle will be outlined. The grill apparatus begins in an inactive state, with its upper platen 20 in its fully opened and raised position. The upper platen 20 is at an angle of 54° from horizontal. The operator will select the relevant product setting, e.g., quarter-pound hamburgers, from the menu on control panel 17, then will load the frozen hamburger patties a single layer thick across the surface area of lower platen 11 which will be covered by upper platen 20 when it is lowered. This area may be marked on lower platen 11 for easy reference. When loading is complete, the operator will simultaneously depress one or more "raise platen" and "standby" buttons (not shown), which are physically offset from one another, to initiate the cook cycle.

At this point several things occur. The temperature measurement probes 67 located in lower platen 11 and upper platen 20 will send data to microprocessor 43 regarding the temperature of the platens. Microprocessor 43 will activate heating elements 18 under lower platen 11 and similar heating elements in upper platen 20 when appropriate. At the same time, upper platen 20 will begin its two-phase descent into cooking position. Microprocessor 43 will receive data from positioning pulse encoder 34 and lower sensor switch 38 indicating the relative height of vertical reciprocating shafts 33. The positioning pulse encoder 34 will also provide continuous data on the offset distance between the two positioning switch 38 sites. The pulses received by positioning pulse encoder 34 are monitored. Positioning pulse encoder 34 and lower sensor switch 38 will indicate that upper platen 20 is in its most open, uppermost position. Microprocessor 43 will then activate actuator drive motor 35 which drives linear actuator 31 to begin to lower arm pivot/stop head 24. This motion (combined with the cantilevered weight of upper platen 20) will cause the ends of cantilever bars 22, which are in direct contact with rotational bearings 23, to begin to rotate downward and in a clockwise fashion (when viewed from the side view of FIG. 1) around rotational bearings 32. This, in turn, will cause upper platen 20 to begin to tilt downwards towards horizontal alignment with lower platen 11. In this motion, cantilever bars 22 pivot rotational bearing 32 and the back of cantilever bars 22 roll along the rotational bearing through approximately a 54° arc, and the front edge of upper platen 20 will descend, describing the same 54° arc. The microprocessor will control drive motor 35 throughout this movement so that upper platen 20 is lowered slowly and evenly to minimize any possible safety risks.

The cantilever bars 22 will continue rotating clockwise around rotational bearings 32 until the rear end of the bars engage the stop portion of arm pivot/stop heads 24. This halts the rotational movement of cantilever bars 22 and of upper platen 20. At this point, linear drive motor 35 will continue to lower arm pivot/stop head 24. Because the ends of cantilever bars 22 can no longer rotate due to contact with the stop portion of arm pivot/stop heads 24 there is no more rotation of cantilever bars 22 and upper platen 20 for the remainder of vertical movement imparted by linear drive motor 35 into the system. Thus all motion will now be non-rotational.

The upper platen 20 is now parallel to and suspended above lower platen 11 and hamburger patties. As linear actuator 31, driven by linear drive motor 35, and controlled by motor positioning controller 15, continues to lower arm pivot/stop head 24 and cantilever bars 22, upper platen 20 descends to a predetermined position above lower platen 11. This position was programmed into user interface control 17 for the specific product to be cooked. The positioning pulse encoder 34 will be sending calibrated height data to microprocessor 43. Any inconsistent data will trigger an error or servicing message on interface control 17, and an audible alarm. The height data will pinpoint the height of upper platen 20 above lower platen 11, and above the particular food item to be cooked.

Microprocessor 43 will stop linear drive motor 35 at the exact point set forth in its programming for the beginning of the cook cycle. This height measurement is derived from prior testing data on standardized menu items to provide optimal cooking contact and pressure. The microprocessor is capable of controlling the gap setting to a very precise degree, down to (+/−) 0.0015 inch gradations.

The cooking cycle can be canceled by depressing raise/lower button 16. This allows the operator to change menu selections or other operating parameters.

For optimal cooking results, microprocessor 43 can be programmed to follow the following steps: precisely apply pressure to the food item to sear the underside of the food; raise the upper platen 20 to release any trapped steam from the food; and precisely lower upper platen 20 again to apply pressure to the food and sear the upper surface of the food. This pressure is then precisely controlled through the remainder of the cooking process. This improved process can create a finished food product having improved appearance and taste, as compared to food produced by a conventional two-sided cooking process. Further details concerning the operation of grill 1, with an upper platen 20, are discussed in the aforementioned U.S. Pat. No. 7,082,941.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A grill for cooking food products, comprising:
a substantially flat platen comprising a top surface and a bottom surface, said top surface for receiving the food products, wherein said platen has a front end and a back end so that a user operates the grill from said front end of the platen, and the platen is divided into a plurality of independently controlled heating zones adjacent to one another along a length of said platen from said front end to said back end;
a plurality of heating elements below said bottom surface, wherein each of said heating zones has heating element associated therewith, and wherein each of said heating elements is a forced draft gas burner having a burner fan associated therewith;
a pressurized burner box, wherein each of said plurality of heating elements are within said burner box;
a chassis connected to said platen and enclosing each of said plurality of heating elements and said burner box, so that said platen and said plurality of heating elements are within a single lane of the grill;
a controller in communication with each of said plurality of heating elements wherein said controller controls an operating temperature of each of said plurality of heating elements independently of other heating elements, and
wherein said controller controls each burner fan to operate at a first speed or a second speed, wherein said first speed is higher than the second speed, wherein said first speed is sufficient to provide air for combustion at said gas burner, and said second speed is sufficient to block air from said pressurized burner box from travelling back through said gas burner.

2. The grill of claim 1, wherein each of said heating elements further comprises a feed pipe, a burner plenum, an ignition device, and a gas valve, wherein an air-gas mixture is introduced through said feed pipe, and is ignited by said ignition device, so that said gas burner provides heat to the associated heating zone in said bottom surface of said platen.

3. The grill of claim 2, further comprising a temperature probe in communication with said controller, wherein said temperature probe extends through a hole in said burner box and said burner plenum, to measure a temperature of each of said heating zones in said platen.

4. The grill of claim 3, wherein said controller adjusts an amount of said heat supplied to each of said heating zones by said gas burner, based at least in part on data received from said temperature probe.

5. The grill of claim 1, wherein the burner box is sealed to the bottom surface of the platen.

6. The grill of claim 1, further comprising a device associated with each of the plurality of gas burners, wherein the device is between said burner fan and said gas burner, and wherein the device closes when the burner is not on, to prevent heat from said pressurized burner box from flowing through said burner.

7. A method of operating the grill of claim 1,
the method comprising the steps of:
controlling each of said heating elements independently;
monitoring a temperature in each of said heating zones; and
adjusting an amount of heat supplied to each of said heating zones by said heating element based at least in part on said monitoring step.

8. The method of claim 7, wherein each of said gas burners comprises a feed pipe, a plenum, the fan, and an ignition device, wherein an air-gas mixture is introduced through said feed pipe, and is ignited by said ignition device, so that said gas burner provides heat to said bottom surface of said platen.

9. The method of claim 8, further comprising a temperature probe, wherein said temperature probe extends through a hole in said burner box and said plenum, to measure a temperature of said platen.

10. The method of claim 7, further comprising the step of controlling one of said heating elements to provide heat to said platen, and controlling the fan to provide an air flow to an adjacent one of said heating elements that is not providing heat to said platen.

* * * * *